F. & A. A. HANSEN.
GARDEN CULTIVATOR.
APPLICATION FILED SEPT. 14, 1917.
1,288,571.
Patented Dec. 24, 1918.
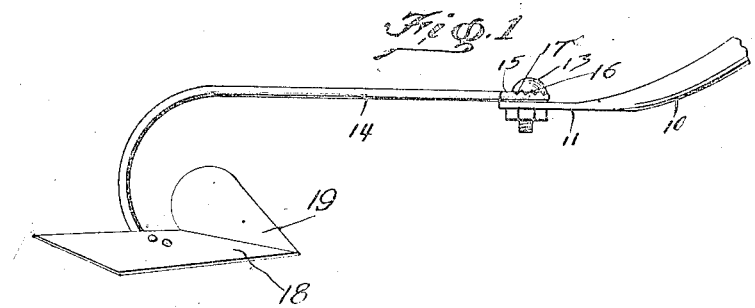
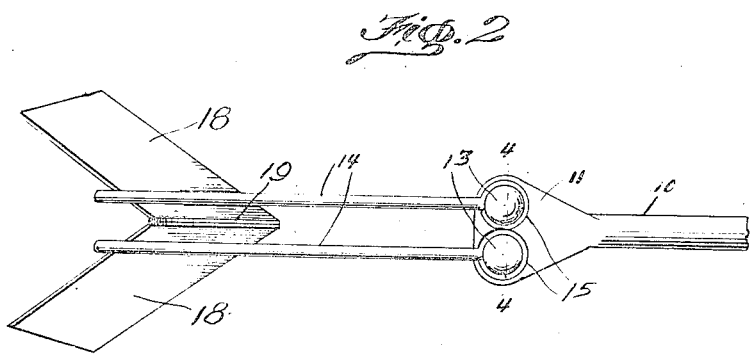
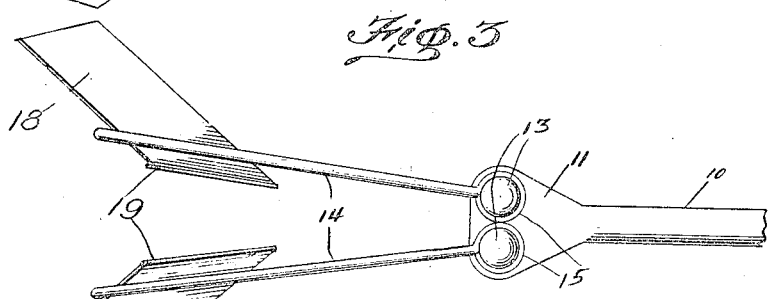
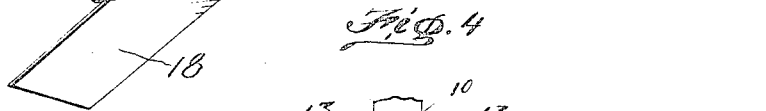
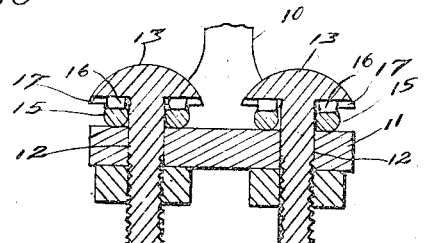

UNITED STATES PATENT OFFICE.

FRANK HANSEN AND ARTHUR A. HANSEN, OF MELROSE, MINNESOTA.

GARDEN-CULTIVATOR.

1,288,571.  Specification of Letters Patent.  Patented Dec. 24, 1918.

Application filed September 14, 1917. Serial No. 191,399.

*To all whom it may concern:*

Be it known that we, FRANK HANSEN and ARTHUR A. HANSEN, citizens of the United States, residing at Melrose, in the county of Stearns, State of Minnesota, have invented certain new and useful Improvements in Garden-Cultivators; and we do hereby declare the following to be a full, clear, and exact description of the invention, such as will enable others skilled in the art to which it appertains to make and use the same.

This invention relates to garden cultivators and it has for its object to provide a convertible tool in which the blades may be operated in separated relation to open up and throw the soil from both sides of a row simultaneously and in which the blades may subsequently be adjusted to jointly form a "scooter" through the medium of which the soil from the mutually adjacent sides of two rows may be thrown back upon the rows. This results in a very efficient cultivation and permits of a most efficient application of fertilizer beneath the top soil of the finally finished row. A further object of the invention is to provide such a particular arrangement as that the mold-boards of the blade sections may serve not only to turn the soil from the plants when the sections are spaced apart, but will serve to split the earth and properly divide the quantity between the rows so that the soil may not be transferred from one row to the other in the covering operation.

In the drawing:

Figure 1 is a side elevation of our improved garden implement.

Fig. 2 is a top plan view of the device when used as a furrow opener.

Fig. 3 is a top plan view of the device when used as a cultivator.

Fig. 4 is an enlarged transverse sectional view taken on the line 4—4 of Fig. 2.

Referring particularly to the accompanying drawing 10 represents a handle shank on one end of which there is mounted for vertical pivotal movement a flattened shank 11. In the outer end of this flattened shank there are formed two vertical openings 12 for the reception of the bolts 13. A pair of cultivator beams 14 are each formed with an eye 15 at the inner end for registration with one of the said openings 12 and arranged to receive the said bolt 13 therethrough. Each of the eye portions is formed with a series of teeth or serrations 16 for the reception of similar teeth or serrations 17 formed on the lower face of the head of the bolt. Thus the beams are capable of pivotal adjustment and will be held firmly against lateral movement. Secured to the outer hooked ends of the cultivator beams are the cultivator shovels which include the wing portions 18 and the vertical mold-boards 19. It will be noted that the landside portions are disposed inwardly of the wing portions, whereby when the beams are adjusted to close proximity to each other the said portions 19 will abut and form a single vertically extending blade, while the wing portions will extend outwardly from opposite sides thereof.

As is well understood with those familiar with the art of gardening, very efficient cultivation may be effected by turning the soil from the row and then subsequently throwing the turned soil back on the row. Particularly is this method efficient when the soil is loamy. This method further permits of the application of sub-soil fertilizer, which in practice is found to bring most advantageous results.

In practising this method of cultivation, it will of course be understood that the blade sections or shovels are first set apart as shown in Fig. 3 of the drawings so that the shovels pass along the opposite sides of the row of plants, the wing portions serving to raise the soil and the mold-board portions serving to turn it outwardly, this outward turning being effected by reason of the then angular arrangement of the mold-boards with respect to the direction of travel.

The shovels are then set with their mold-boards in mutual contact as shown in Fig. 2 so that a scooter is formed which when drawn between the rows divides the loose earth by reason of the upstanding mold-boards while the inclination of the wings and their angular arrangement with respect to each other serves to insure passage of the soil to and over the outer end edges of the wings and back to the rows.

What is claimed is:

A convertible garden cultivator comprising a handle and a pair of shovels each including an upstanding mold-board and a wing projecting laterally and rearwardly therefrom and means for holding the shovels in fixed relation to the handle and interchangeably in spaced relation with the mold-boards rearwardly divergent or with the mold-boards and the foremost points of the wings in mutual contact respectively.

In testimony whereof, we affix our signatures in the presence of witnesses.

FRANK HANSEN.
ARTHUR A. HANSEN.

Witnesses:
F. J. RUTH,
JACOB MON,
JOHN BONEMEYER.